United States Patent Office 3,749,794
Patented July 31, 1973

---

3,749,794
ETHER COMPOUNDS AS INHALATION ANESTHETICS
Ross C. Terrell, Plainfield, and George L. Moore, South Plainfield, N.J., assignors to Airco, Inc.
No Drawing. Filed Aug. 13, 1971, Ser. No. 171,735
Int. Cl. A61l 27/00
U.S. Cl. 424—278                    2 Claims

ABSTRACT OF THE DISCLOSURE

Cyclic ether compounds of the formula

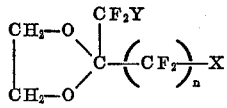

wherein X is H or F, Y is H or F, and $n$ is 0 or 1, with the provisos that when X is F then $n$ is 1, and when Y is F then $n$ is 0 and X is H.
persants for fluorinated materials. In addition, those compounds wherein when $n$ is 1 then X is F and Y is H, and when $n$ is 0 then X is H and Y is F—i.e., 2-difluoromethyl-2-trifluoromethyldioxolane and 2-trifluoromethyl dioxolane—are useful as inhalation analgesics and anesthetics.

---

This invention relates to cyclic ether compounds having the formula

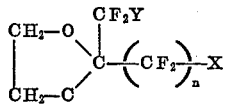

wherein X is H or F, Y is H or F, and $n$ is 0 or 1, with the provisos that when X is F then $n$ is 1, and when Y is F then $n$ is 0 and X is H.

The ether compounds of this invention are easily miscible with other organic liquids, including fats and oils, and have useful solvent properties, for example as solvents for fluorinated olefins and other fluorinated materials, such as fluoro waxes. The compounds of this invention may be used to prepare pastes and dispersions of such materials useful for coatings and the like, and may be used as degreasing agents. In the latter capacity, for example, the ether compounds of this invention can be used as solvents to remove grease or other oily substances from metal surfaces that are to be painted.

In addition, the compounds of the above formula wherein X is F, Y is H, and $n$ is 1 and wherein X is H, Y is F, and $n$ is 0, lend themselves to effective use as inhalant analgesics and anesthetics in respirable mixtures containing life-supporting concentrations of oxygen, with or without other inhalation anesthetics, such as nitrous oxide. Administration of these compounds may be by any of the well known techniques for administering general inhalation analgesics and anesthetics, for example by using the open drop, semiclosed, or closed systems.

The effective amount of the anesthetics of this invention to be employed depends on the level of anesthesia to which the mammal is to be brought, the rate at which anesthesia is to be induced, and the length of time over which anesthesia is to be maintained. The amount used should be sufficient to provide a significant anesthetic effect, but not so much as to produce unacceptable deleterious side effects. Vapor concentrations at which the anesthetic compounds of this invention may often be used are about 0.5 to 5 volume percent, with the concentration actually employed depending on the choice of anesthetic; for instance, 2-trifluoromethyl dioxolane may often be used in an amount of about 2 to 5%, and 2-difluoromethyl-2-trifluoromethyl dioxolane may often be used in an amount of about 0.5 to 2%.

The amount of anesthesia to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

The following examples illustrate the preparation of the compounds of the present invention.

EXAMPLE I

This example illustrates the preparation of 2,2-bis(difluoromethyl)-dioxolane.

Commercially obtained tetrafluoroacetone (52 g.) was dropped into a solution of ethylene chlorohydrin (31 g.) in pentane (80 ml.) at 20° C. The mixture was then cooled to 10° C. and anhydrous, granular $K_2CO_3$ (35.5 g.) was gradually added. Stirring was continued for another 11.5 hours. The mixture was diluted with water, followed by decanting water and pentane from the solid product, and washing several times more with water. The solid was finally dried in a desiccator over sulfuric acid to give 45 g. of 99.7% pure product of the formula

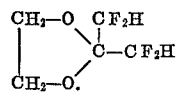

Calculated for $C_5H_6F_4O$ (percent): C, 34.6; H, 3.46; F, 43.6. Found (percent): C, 34.3; H, 3.7; F, 43.9.

This normally solid ether has a boiling point of 136° C., a melting point range of 40–42° C., a vapor pressure at 25° C. of 10 mm. Hg pressure, and an odor similar to that of camphor. It is nonflammable.

EXAMPLE II

This example illustrates the preparation of 2-difluoromethyl-2-trifluoromethyl-dioxolane.

Commercially obtained pentafluoroacetone (66 g.) was added to a solution of ethylene chlorohydrin (31 g.) in pentane (80 ml.) at 20° C. $K_2CO_3$ (35.5 g.) was added gradually, followed by stirring for 11 hours. The mixture was diluted with water, diethyl ether was added and the ether-pentane layer was separated. The aqueous layer was extracted with diethyl ether, and the combined organic layers were dried over anhydrous $K_2CO_3$. Diethyl ether and pentane were stripped off and 99.0% pure

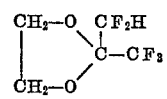

(64 g.) was obtained at 57–59° C., and 77 mm. Hg pressure.

Calculated for $C_5H_5F_5O_2$ (percent): C, 31.2; H, 2.6; F, 49.4. Found (percent): C, 31.3; H, 2.7; F, 49.0.

This normally liquid ether has a boiling point of 119° C., a refractive index ($n_D^{20}$) of 1.3331, a specific gravity of 1.485, a vapor pressure at 25° C. of 21.0 mm. Hg, and an odor like that of camphor. It is nonflammable.

EXAMPLE III

This example illustrates the preparation of 2-trifluoromethyl dioxolane.

Trifluoroacetaldehyde, generated by dropping commercially obtained trifluoroacetaldehyde methyl hemiacetal (56 g.) into hot (150–180° C.) 40% polyphosphoric acid (250 ml.), was added to ethylene glycol (24.0 g.) at −5 to 0° C. Concentrated sulfuric acid (37.5 ml.) was then dropped in, followed by warming to 72–78° C., at which temperature the mixture was stirred for 3 hours. The cooled mixture was added to cold water and the $H_2SO_4$ was neutralized with KOH. Diethyl ether was thoroughly mixed with the aqueous mixture and a small quantity of solid was removed by filtration. The diethyl ether layer was separated and the aqueous layer was extracted with diethyl ether. Diethyl ether was stripped from the dried ($K_2CO_3$) extracts, then 16.0 g. of 90% pure product was obtained at 86–92° C. By preparative chromatography 12.5 g. of pure

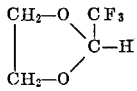

was isolated.

Calculated for $C_4H_5F_3O_2$ (percent): F, 40.1. Found (percent): F, 42.6.

This normally liquid ether has a boiling point of 89.5° C., a refractive index ($n_D^{20}$) of 1.3379, a specific gravity of 1.46, and a vapor pressure at 25° C. of 69 mm. Hg. It is flammable.

In order to determine the potency of the anesthetic ethers of the present invention as inhalation anesthetics in combination with oxygen, tests were carried out on mice. Each compound tested was at least 99.5% pure as determined by vapor phase chromatography. In the tests, the ether compound is administered to test mice by a standard procedure in which a measured quantity of the agent is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk.

In such tests the 2-difluoromethyl-2-trifluoromethyl-dioxolane induced a light anesthesia in 1 minute-48 seconds when employed at a vapor concentration of 0.5 volume percent. The induction was accompanied by mild excitement. Recovery took 51 seconds. The mice were sluggish after recovery. Using a vapor concentration of 1%, the induction time was shortened to 1 minute-7 seconds. Short duration analgesia was also observed. Recovery required 3 minutes-46 seconds and again left the mice sluggish. At 1.5% vapor concentration, the induction period was 20 seconds and the recovery period was more than 10 minutes. There was some slowing of respiration rate during maintenance of the anesthesia at this level but no cyanosis. Again, the mice were sluggish after recovery.

When using 2.5% vapor concentration of 2-trifluoromethyl-dioxolane, the induction period was 2 minutes-12 seconds to obtain a very light anesthesia and the recovery required 38 seconds. At 4% concentration, the induction period was shortened to 1 minute-5 seconds and recovery was lengthened to 4 minutes-4 seconds. The ether was also analgesic at both concentrations.

While there has been described what are at present considered to be preferred embodiments of the invention, it will be understood that various modifications may be made therein which are within the true spirit and scope of the invention.

We claim:

1. An inhalant anesthetic composition comprising cyclic ether compound of the formula

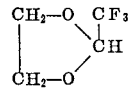

and oxygen in suitable proportions for use as an anesthetic.

2. A method of anesthetizing an anesthetic-susceptible mammal which comprises administering to the mammal an anesthetically effective amount of cyclic ether compound of the formula

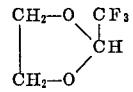

as an inhalation anesthetic while administering life-supporting amounts of oxygen.

References Cited

Chemical Abstracts 54: 1320f–1321b (1960).
Chemical Abstracts 54: 21101a–21103a (1960).
Larson, Fluorine Chemistry Reviews, vol. 3 (1969), p. 39.

JEROME D. GOLDBERG, Primary Examiner

U.S. Cl. X.R.
260—340.9